GEOPHONE CLIP

Filed Feb. 11, 1954 2 Sheets-Sheet 1

Clifton O. Randall
Lawrence D. Zepernick
Kenneth W. McLoad
INVENTORS

BY

Browning Simms & Hyer
ATTORNEYS

May 21, 1957 C. O. RANDALL ET AL 2,793,355

GEOPHONE CLIP

Filed Feb. 11, 1954 2 Sheets-Sheet 2

Clifton O. Randall
Lawrence D. Zepernick
Kenneth W. McLoad
INVENTORS

BY Browning, Simms & Hyer
ATTORNEYS

United States Patent Office 2,793,355

Patented May 21, 1957

1

2,793,355

GEOPHONE CLIP

Clifton O. Randall, Lawrence D. Zepernick, and Kenneth W. McLoad, Houston, Tex., assignors to Vector Manufacturing Company, Houston, Tex., a partnership Application February 11, 1954, Serial No. 409,652

10 Claims. (Cl. 339—200)

This invention relates to a clip for releasably attaching lead wires from a geophone or the like to a geophone cable or the like and more particularly to an improved form of the clothespin type of clip.

In seismic exploration, it is common to employ a number of geophones strung out over a considerable distance. The geophones, which are provided with relatively short lead wires, are connected to a central recording station by a geophone cable extending from the recording station to a group of geophones. Such cable contains a number of pairs of wires and is usually strung from geophone to geophone.

Leads from each geophone are releasably attached to the cable at take-outs spaced therealong. This arrangement allows the geophone to be detached from the cable and the cable to be wound on a reel to facilitate relocation of the cable and geophones. The location of the geophones may be changed several times daily. Each such change in location requires a re-stringing of the cable and the re-attachment of the geophones to the cable. To facilitate this frequent re-attachment, it has been proposed to attach geophone lead wires to a take-out electrode surrounding the cable by gripping the electrode between the jaws of a spring-loaded clip much in the manner of a common spring-loaded clothespin engaging a wire.

The cable and geophone lead wires are strung on the ground and hence, the clip must be able to withstand considerable abuse such as being stepped upon by workmen or even run over by vehicles.

One type of clip heretofore used for this purpose employed a molded, one-piece, plastic body of very flexible material in which the jaws of the clip were urged toward each other by an exterior wire spring. Due to the high flexibility of the one-piece, plastic body, the clip was not easily damaged, but in cold weather the plastic jaws tended to stiffen and were very difficult to close. Thus, the force with which the clip jaws gripped the take-out electrode varied with temperature conditions, and in very cold weather, it was difficult to insure adequate contact between the clip and take-out electrode.

The clip referred to above was fabricated by first attaching the geophone lead wires directly to the electrodes in the jaws of the clip and then molding the plastic body of the clip about this connection, the adjacent portion of the lead wires, and the electrodes, leaving only the electrodes exposed in the bite faces of the clip jaws. If the clip was damaged, it could not be repaired or replaced in the field but had to be returned to the factory where molding equipment was available to mold a new clip on to the geophone leads.

The external wire spring which urged the jaws together also tended to be easily removed from the clip, and they were frequently lost. The electrodes of this clip were wrapped with laterally extending wraps of wire as proposed in this invention, but the jaws were very flexible and the cleaning action obtained was far inferior to that obtainable with rigid jaws.

2

It is an object of this invention to provide a geophone clip of the type referred to which is rugged and will withstand considerable abuse whose gripping force is not affected by changes in temperature.

Another object is to provide a clip of the type referred to which can be attached to geophone lead wires in the field.

Another object is to provide a geophone clip of the type referred to in which the several parts of the clip can be replaced in the field.

Another object is to provide a geophone clip of reinforced plastic which will withstand a weight of the order of the axle load of a cable truck.

Another object is to provide a double-jawed geophone clip which is self-grounding and which when secured to a geophone cable cannot be easily removed without further opening of the jaws of the clip.

Another object is to provide a clip of the type referred to in which the geophone lead wires are attached to external connectors on the clip body and a moisture-proof jacket is provided about the connection.

Another object is to provide a clip of the type referred to in which the clip electrodes will clean the cable take-out electrodes when the clip electrodes are moved across the cable electrodes.

Another object is to provide a double contact clip of the type referred to in which both conductors from the clip to a geophone are attached to the base or one jaw of the clip and the clip jaws may be opened and closed without flexing the wires.

Another object is to provide a double contact clip of the type referred to in which both wires of a two conductor cable from the clip to a geophone are attached to the base or one jaw of the clip and a seal is provided between the jacket covering the two conductors and the base.

Another object is to provide a geophone clip in which the means urging the jaws toward each other is interiorly of the clip and cannot be lost or torn off in use.

Another object is to provide a double contact geophone clip in which the two leads to the clip from the geophone are connected to one jaw of the clip and electrical contact between one of said leads and the other jaw of the clip is positively maintained so long as the clip is operative.

Other objects and advantages of this invention will be apparent to one skilled in the art from a consideration of the specification, claims and appended drawings.

In the drawings wherein there is shown an illustrative embodiment of this invention, and wherein like reference numerals indicate like parts:

Figure 1:
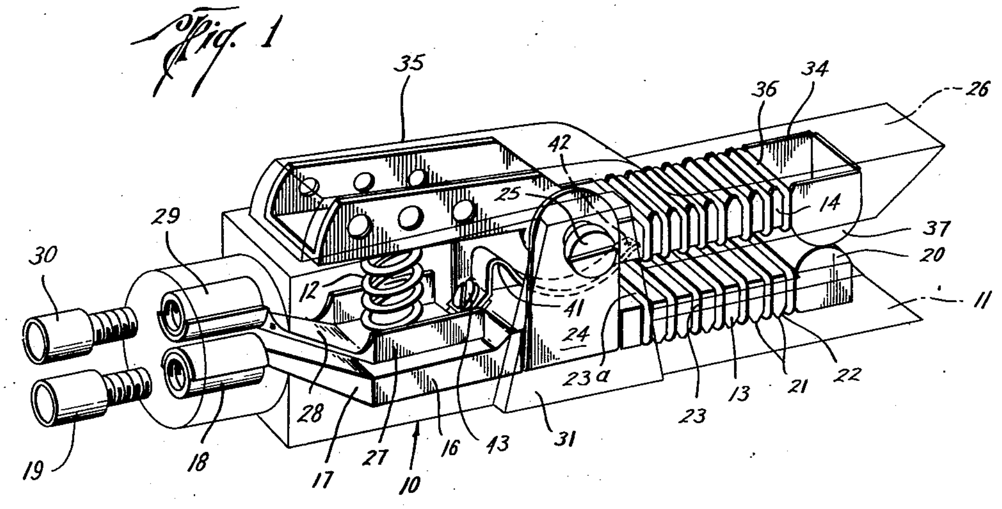
Fig. 1 is a perspective view of a preferred form of this invention with the metal parts of the clip shown in solid lines and the plastic portions of the clip shown in phantom.

Referring to the geophone clip illustrated, the clip includes a base 10 which carries a fixed jaw 11. The jaws are urged toward closed position by a coil spring 12 and are provided with electrodes 13 and 14 in the fixed and movable jaw, respectively. Electrodes 13 and 14 are insulated from each other except across their bite faces and establish contact between electrodes 15 in the cable take-out and a pair of wires leading to a geophone when the clip is fastened to the cable take-out.

Referring particularly to Fig. 1, the base, indicated generally at 10, includes a metallic core 16. An extension 17 of metallic core 16 terminates in a connector 18 to which may be threadedly connected geophone lead 19. Metallic core 16 extends into fixed jaw 11 and this extension comprises electrode 13. Preferably, electrode 13 terminates at the free end of the jaw in a ridge 20 projecting inwardly from the bite face of jaw 11 necessitating the further opening of the jaws before the clip can be removed from a cable takeout. The back side of electrode 13 is provided with lands and grooves 21 and 22, respectively. A length of wire 23 is wrapped about electrode 13 and spaced therealong by lands 21 to provide spaced protrusions **23*a* on the bite face of jaw 11. Preferably, wire 23 is a hard, corrosive resistant conductor such as Monel metal. Protrusions 23*a* protect electrode 13 against wear and will clean the surface of electrodes 15 on the cable take-out when the clip is moved across the cable take-out. The clip is usually secured to the cable several times daily and the normal making and breaking of the connection will be sufficient, in most cases, to keep the electrodes 15** bright and clean. In the case of a very dirty take-out, the clip may be rotated back and forth about the take-out to clean the electrodes. As the jaws of the clip are substantially rigid, this cleaning action will be effective along the entire length of the jaws.

Metallic core 16 nestles in an upstanding saddle 24 which carries hinge pin 25. Movable jaw 26 is mounted on this hinge pin for rotation thereabout. A metallic contact plate 27 is spaced above metallic core 16 and carries an extension 28 which terminates in a connector 29 to which may be threadedly connected geophone lead 30.

The metallic parts of the base are carried by a molded body of plastic material 31 which may be polyvinyl chloride. The plastic body should be made of a material which can be fused to the sheathing about the geophone lead wires or to a boot of material which in turn is fusable with the sheathing. This plastic body insulates plate 27 and its associate connector 29 from the remaining metallic parts in the base and provides an outer covering to prevent accidental grounding of the clip.

Figure 2:
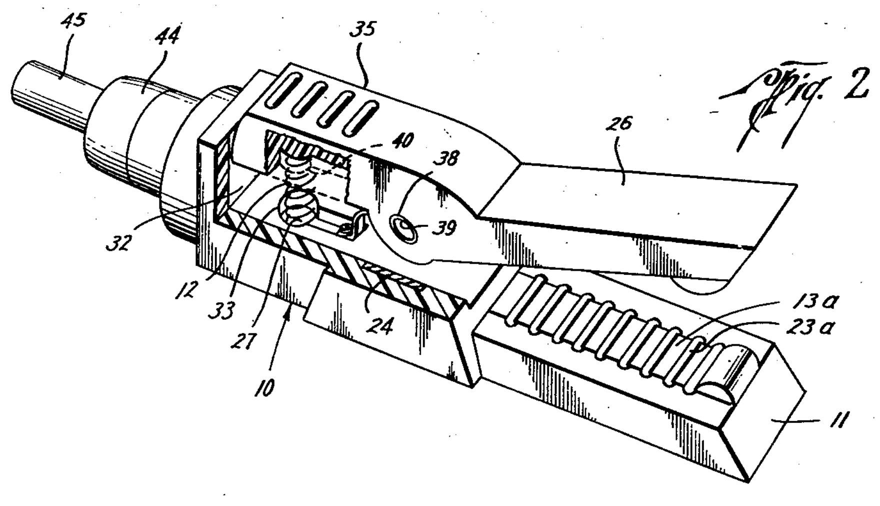
Fig. 2 is a perspective view of the clip of Fig. 1 with parts broken away to illustrate certain details of the clip.

As shown in Fig. 2, the molded plastic body of the clip is shaped to provide a large well 32 which receives the thumb piece of the movable jaw 26. A small well 33 is provided in the bottom of well 32 and exposes the upper surface of plate 27 so that electrical contact may be made between the plate and the movable jaw through spring 12 which seats in well 33. Of course, the ends of connectors 18 and 29, as well as the contact face **13*a* of electrode 13**, are left exposed.

A plastic covered, metallic structural member 34 provides the movable jaw 26 and a thumb piece 35 for actuating the jaw. Structural member 34 is exposed on its nether side to provide electrode 14. Spaced protrusions are provided on the bite face of the movable jaw by wraps of wire 36 which are spaced in the same manner as wire 23 on the fixed jaw. The free end of electrode 14 also terminates in a ridge 37 which engages ridge 20 when the jaws are closed to short circuit the geophones. This short circuit feature is highly desirable as the current induced in the geophone during transporting of the phones will dampen the movement of the spring in the phone and prolong its life when the circuit is closed, as will be well understood by those skilled in the art.

Movable jaw 26 is provided with a bore 38 in which there is positioned an insulating bearing 39. Pin 25 passes through bearing 39 and thumb piece 35 is received in well 32 in a manner to permit hinging action of the movable jaw about hinge pin 25.

Structural member 34 is completely covered with plastic material, except for the bite face of the jaw and a well 40 in the nether side of thumb piece 35 which receives one end of spring 12. Wells 33 and 40 serve to maintain spring 12 in proper position, and as the wells expose the surfaces of structural member 34 and contact plate 27, the spring will also provide electrical contact between these parts.

Preferably, the upper jaw is constructed to withstand considerable abuse and to protect the base and lower jaw. For this purpose, the plastic material of the movable jaw is preferably a very tough material such as polystyrene, which will withstand considerable abuse. The movable jaw 26 and thumb piece 35 are substantially rigid and extend substantially the entire length of the clip. As the movable jaw is usually above the base, the movable jaw will afford protection for the base and lower jaw which should be molded of a weaker plastic material to permit a moisture-proof connection between the base and the sheathing about the geophone lead wires.

To insure complete electrical contact between electrode 14 and plate 27 at all times, there is provided a leaf spring 41 which is permanently secured at one of its ends to electrode 14 by pin 42, and releasably secured to plate 27 at its other end by screw 43.

In assembling the clip, leaf spring 41 is first secured to plate 27 and then spring 12 is positioned in its wells. Pin 25 may be then inserted and secured in place in any desired manner.

After leads 19 and 30 have been secured to receptacles 18 and 29, the connections should be waterproofed to prevent moisture from entering the sheathing about the lead wires. For this purpose, a covering 44 of plastic material may be extruded over the connection to provide the waterproof covering. The extruded cover may be any material which will fuse with the plastic body of the clip and with the sheathing 45 about the lead wires. Preferably, the sheathing, the body of the clip, and the boot of extruded material are all three polyvinyl chloride. In the event the clip is replaced in the field, this covering of extruded material will, of course, not be available. However, a substantially waterproof connection can be provided by wrapping the connection with water resistant tape.

Figure 4:
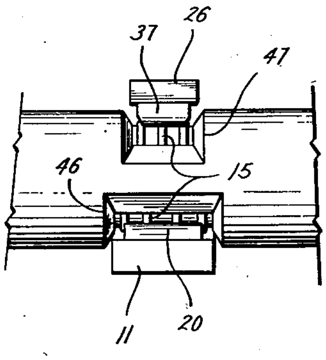
Fig. 4 is a view along the lines 4—4 of Fig. 3.

Referring to Fig. 4, it is pointed out that movable jaw 9 is considerably narrower than fixed jaw 11 and that the jaws are dimensioned to substantially correspond to the widths of the windows 46 and 47 of the cable take-out. With this arrangement, it is impossible to reverse connect the clip to the cable and polarization of the geophones with the recording instrument will be insured.

Figure 3:
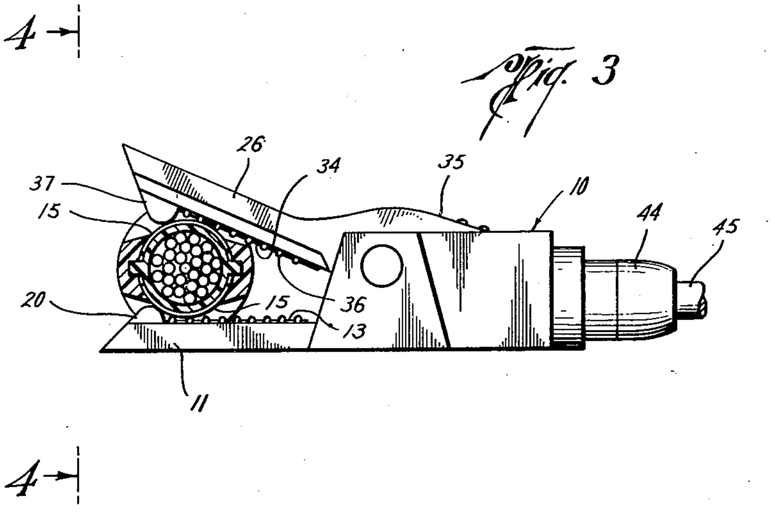
Fig. 3 is a cross-sectional view through a cable take-out with the clip of Fig. 1 shown in elevation and gripping the take-out.

Referring to Fig. 3, it will be noted that ridges 20 and 37 will not permit the clip to be accidentally removed from the cable as they require the jaws to be opened a considerable distance before the connection can be broken.

From the above, it will be appreciated that there has been provided a simple, rugged clip which will withstand considerable abuse but which is not susceptible to change in the gripping force exerted by the jaws due to changes in temperature. The several parts of the clip may be exchanged in the field when damage has occurred and, if necessary, an entirely new clip may be secured to the geophone leads.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A clip for releasably attaching lead wires from a geophone or the like to a geophone cable or the like comprising; a base supporting a pair of rigid, elongate, coacting jaws for gripping a cable take-out; said base comprising a body of plastic material molded about a metallic core, one end of which provides the electrode of one of said jaws, a saddle to which the movable jaw is hinged, and a metallic plate spaced from the metallic core; said core and plate having connectors exposed to the exterior of the plastic body to which the lead wires may be attached; said movable jaw comprising a body of plastic material molded about a metallic core which provides the electrode of the movable jaw; an extension on said movable jaw to provide a thumb piece for actuating the movable jaw; a pair of opposed wells in the base and thumb piece exposing said metallic plate and the metallic core of the movable jaw; and a coil spring seated in said wells urging the jaws together and providing electrical contact between the plate and electrode of the movable jaw.

2. The clip of claim 1 wherein a leaf spring extends between the electrode of the movable jaw and the metallic plate to insure proper contact therebetween at all times.

3. The clip of claim 1 wherein the plastic material of the base is polyvinyl chloride and the plastic material of the movable jaw is polystyrene.

4. The clip of claim 1 wherein the electrodes are provided with opposed ridges extending from the bite faces of the jaws adjacent their outer extremities which prevent accidental removal of the clip from a cable take-out and which will engage and short across the clip when the jaws are closed.

5. The clip of claim 1 wherein the electrodes are wrapped with spaced lateral wraps of wire which will clean the take-out electrodes when the clip jaws are moved thereacross.

6. The clip of claim 1 wherein a boot of polyvinyl chloride is molded about the connection between said connectors and said lead wires and fused with the plastic material of the base and the sheathing about the lead wires to provide a waterproof connection therebetween.

7. A double contact clip for releasably attaching lead wires from a geophone or the like to a geophone cable or the like comprising, a base supporting a pair of coacting jaws one rigidly attached to the base and the other hinged thereto, an electrode in the bite face of each jaw, means insulating the electrodes from each other when the jaws are not closed, a pair of spaced contacts carried by the base to which the geophone lead wires may be attached, means insulating the contacts from each other, means for establishing electrical contact between one of said contacts and the electrode in the fixed jaw, and means including a spring extending between the other of said contacts and the electrode in the movable jaw establishing electrical contact therebetween.

8. The clip of claim 7 in combination with a double conductor sheathed cable, said two conductors connected to said contacts, and a boot of insulating material fused with the base and sheathing of said cable to provide a waterproof connection between the cable and clip.

9. A double contact clip for releasably attaching lead wires from a geophone or the like to a geophone cable or the like comprising, a base supporting a pair of coacting jaws one rigidly attached to the base and the other hinged thereto, an electrode in the bite face of each jaw, a pair of contacts carried by the base to which geophone lead wires may be attached, means for establishing electrical contact between one of said contacts and the electrode in the fixed jaw, and means for establishing electrical contact between the other of said contacts and the electrode of the movable jaw and urging said jaws toward each other.

10. The clip of claim 9 wherein said last-mentioned means is located interiorly of the clip and protected during use.

References Cited in the file of this patent

UNITED STATES PATENTS

| | | |
|---|---|---|
| 1,014,718 | Parsons | Jan. 16, 1912 |
| 2,023,902 | Riebel | Dec. 10, 1935 |
| 2,025,363 | Taylor | Dec. 24, 1935 |
| 2,522,810 | Bailey | Sept. 19, 1950 |
| 2,658,965 | Smith | Nov. 10, 1953 |
| 2,701,867 | Obenschain | Feb. 8, 1955 |

FOREIGN PATENTS

| | | |
|---|---|---|
| 246,365 | Switzerland | Sept. 16, 1947 |